United States Patent
DuBois et al.

(10) Patent No.: US 6,434,880 B1
(45) Date of Patent: Aug. 20, 2002

(54) SYSTEM FOR APPLYING A CHEMICAL TO VEGETATION

(75) Inventors: Wayne DuBois; Mark DuBois; Brett DuBois; Monte DuBois, all of Boynton Beach, FL (US)

(73) Assignee: Dubois Growers, Inc., Boynton Beach, FL (US)

( * ) Notice: Subject to any disclaimer, the term of this patent is extended or adjusted under 35 U.S.C. 154(b) by 0 days.

(21) Appl. No.: 09/760,982

(22) Filed: Jan. 16, 2001

(51) Int. Cl.[7] ................................................ A01C 23/02
(52) U.S. Cl. ......................................................... 47/1.5
(58) Field of Search ................................ 47/1.5, 1.01 R

(56) References Cited

U.S. PATENT DOCUMENTS

| | | | |
|---|---|---|---|
| 4,019,278 A | 4/1977 | McKirdy | 47/1.5 |
| 4,162,863 A | 7/1979 | Gaudard et al. | 405/45 |
| 4,219,964 A | 9/1980 | Dale | 47/1.5 |
| 4,285,160 A | 8/1981 | Barton et al. | 47/1.5 |
| 4,310,988 A | 1/1982 | Porter, Jr. | 47/1.5 |
| 4,332,106 A | 6/1982 | Barton, IV et al. | 47/1.5 |
| 4,377,920 A | 3/1983 | Bowman | 47/1.5 |
| 4,389,812 A | 6/1983 | Panttaja | 47/1.5 |
| 4,426,807 A | 1/1984 | Maddock | 47/1.5 |
| 4,438,592 A | 3/1984 | Myers | 47/1.5 |
| 4,467,558 A | 8/1984 | Rathman | 47/1.5 |
| 4,471,570 A | * 9/1984 | Chandler | 47/1.5 |
| 4,485,588 A | 12/1984 | Reed | 47/1.5 |
| 4,592,164 A | * 6/1986 | Ballu | 47/1.5 |
| 4,642,937 A | * 2/1987 | McKelvey | 47/1.5 |
| 4,887,384 A | 12/1989 | Reyne | 47/1.5 |
| 4,908,981 A | 3/1990 | Moore | 47/1.5 |
| 5,388,369 A | 2/1995 | Moore | 47/1.5 |
| 5,720,127 A | * 2/1998 | Robertson | 47/1.5 |

* cited by examiner

Primary Examiner—Peter M. Poon
Assistant Examiner—Son T. Nguyen
(74) Attorney, Agent, or Firm—Christopher & Weisberg, P.A.

(57) ABSTRACT

The present invention provides a system for applying a chemical, such as an herbicide, to a surface. A chemical reservoir stores a quantity of the chemical for dispensation to the surface. A flow control unit in fluid communication with the chemical reservoir has a conduit in which the chemical flows. The flow control unit is adjustable to control the rate of chemical flow in the conduit. At least one wiper assembly is in fluid communication with the flow control unit. The wiper assembly includes at least one wick sheet which receives and absorbs the chemical received from the flow control unit and applies the chemical to the surface via a wiping action.

12 Claims, 7 Drawing Sheets

SYSTEM FOR APPLYING A CHEMICAL TO VEGETATION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to an apparatus for the application of chemicals to vegetation, and in particular, to a direct-contact apparatus for the application of herbicide to undesired vegetation without disturbing desired vegetation.

BACKGROUND OF THE INVENTION

Efficient methods of weed control are essential in order to maximize crop yield using modem agricultural techniques. Weeds are most easily eliminated through the effective use and application of chemical herbicides. Costly herbicides must be applied efficiently. So-called "selective" herbicides contain chemical agents formulated for use with specific types of vegetation. In contrast, non-selective herbicides contain an active chemical agent which kills all vegetation with which it comes into contact. Such non-selective herbicides are therefore less expensive to produce than selective herbicides, and may effectively kill all forms of undesirable weeds. However, in applying non-selective herbicides, care must be taken to apply the chemicals in a manner that targets weeds alone, and not valuable crops.

A common method for applying herbicides is direct spraying. Spraying of herbicides suffers from the disadvantages of requiring relatively heavy and expensive equipment. Also, non-selective herbicides can not be applied using this technique because both crops and weeds would be affected. Even when selective herbicides are used, spraying still significantly wastes the herbicide as it is applied on both the crops and the weeds. Thus, efficient use of non-selective herbicides requires a system that minimizes waste and provides for a uniform, controlled application.

A relatively new method of weed control that is particularly suited for this purpose is a direct contact application technique, using a so-called "wick applicator". Wick applicators are an example of direct contact applicators which directly apply the herbicide to weeds by rubbing an absorbent wick-like structure saturated with herbicide onto the weeds. Wick applicators are advantageous to use since comparatively new "systemic" herbicides, as opposed to traditional conventional herbicides which burn vegetation, may be used with such applicators. After contact, a systemic herbicide is absorbed by the vegetation and permeates the root systems to kill weeds without affecting the soil.

Mechanisms which employ wick applicators mounted to farming vehicles that traverse crops and apply herbicides through a wiping action are known. Due to the variety of crops, a wick applicator's particular structure is dictated by the size, layout, and density of the weeds relative to the crops. Since many weeds tend to initially outgrow crops in the early stages of growth, several direct contact applicators have been developed to take advantage of this differential in plant height. For example, devices in which a wiper bar is mounted to a hydraulic positioning assembly adjusted to conform to the nominal height of weeds while remaining above the crops growing below are known. However, crops which outgrow the nominal height of the weeds are subject to destruction by the applicator mechanism coming into physical contact therewith. This technique is also inherently inefficient in that it targets weeds relatively late in their growth cycle, in which the weeds have already diverted a significant amount of soil nutrients from the crops.

Also, in applying herbicide in a wiping action, the amount of herbicide applied is a function of the time in which the herbicide-saturated wick is in contact with weeds as the apparatus traverses the field. To increase this contact time, devices which take advantage of vertical wick positioning have been proposed. These devices provide structures in which the angular orientation of the wick with respect to the direction of travel of the tractor allows for greater contact time. However, these devices suffer from the disadvantage of using rope-shaped wicks with a low relatively low contact surface area and thus a low contact time.

Another shortcoming of the known structures is that they fail to work when applied to crops with furrows, or spaces between rows of plants. To effectively target weeds in furrows before they have appreciably grown, direct contact applicators must conform to the particular shape of the furrows. Known devices use a deformably rigid wick applicator of annular shape with a relatively low contact surface area. This arrangement is disadvantageous because the applicator must be manually deformed to conform to the particular shape of different furrows. The manual deformation requirement results in a relatively low contact time with the weeds, the failure to contact and apply chemicals to the weeds and undesired contact with seeded areas and wanted vegetation.

Thus, it is desirable to have an apparatus for applying chemicals to vegetation, in particular non-selective herbicidal chemicals, which is suitable for use in furrows having varying cross-section, and which has sufficient flexibility so as to closely conform to the contours of the furrows. It is further desirable to provide a large applicator contact surface area to apply the chemical to the weeds. And it is further desirable to provide an injection system to uniformly distribute chemical in a controlled and efficient manner from a supply source onto the applicator surface.

SUMMARY OF THE INVENTION

The present invention advantageously provides a system for applying a chemical, such as an herbicide, to a surface. For example, the system provided by the present invention makes the application of a non-selective herbicide to undesired vegetation growing in a furrow efficient, cost effective and convenient.

One aspect of the present invention provides a chemical applicator apparatus for applying a chemical from a chemical supply source to a surface, in which an intake manifold has at least one fluid receiving opening and at least one fluid distribution opening. Each fluid receiving opening receives a chemical flow from the chemical supply source and each fluid distribution opening distributes the received chemical flow. At least one planar interface element is in fluid communication with a respective fluid distribution opening. Each planar element receives the chemical flow from the fluid distribution opening. At least one wick sheet is coupled to and is in fluid communication with the at least one planar interface element. Each wick sheet absorbs the chemical flow from the at least one planar interface element and applies the chemical flow to a surface in contact with the wick sheet.

As another aspect, the present invention provides a system for applying a chemical to a surface, in which a chemical reservoir storing a quantity of chemical for dispensation to the surface is provided. A flow control unit is in fluid communication with the chemical reservoir, and includes a conduit in which the chemical flows from the chemical reservoir through to at least one wiper assembly. The flow control unit is adjustable to control the rate of chemical flow in the conduit. Each wiper assembly is in fluid communication with the flow control unit. At least one wick sheet is coupled to the wiper assembly. Each wick sheet absorbingly receives the chemical from the flow control unit and wipingly applies the chemical to the surface.

As yet another aspect, the present invention provides a chemical applicator apparatus for applying a chemical from a chemical supply source to a surface. The applicator comprises a frame, at least one wick assembly coupling member, and a plurality of wick assemblies. Each wick assembly coupling member has a first end portion adjustably coupled to the frame, and a second end portion opposite the first end portion. Each wick assembly is individually coupled to the second end portion of the wick assembly coupling member. The plurality of wick assemblies are in fluid communication with the chemical supply source, each wick assembly wipingly applying the chemical to the surface.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As used herein, the term "herbicide" refers to a chemical formulated to kill vegetation for agricultural applications. The herbicide is preferably in liquid form under standard temperature and pressure conditions, or a liquid solution or liquid suspension of solid herbicide. It is also understood that the present invention is not relegated to use solely with herbicides. It is contemplated that any form of chemical agent, such as a pesticide or fertilizer may be used, as long as the chemical agent is dispensable in liquid form.

Figure 1:
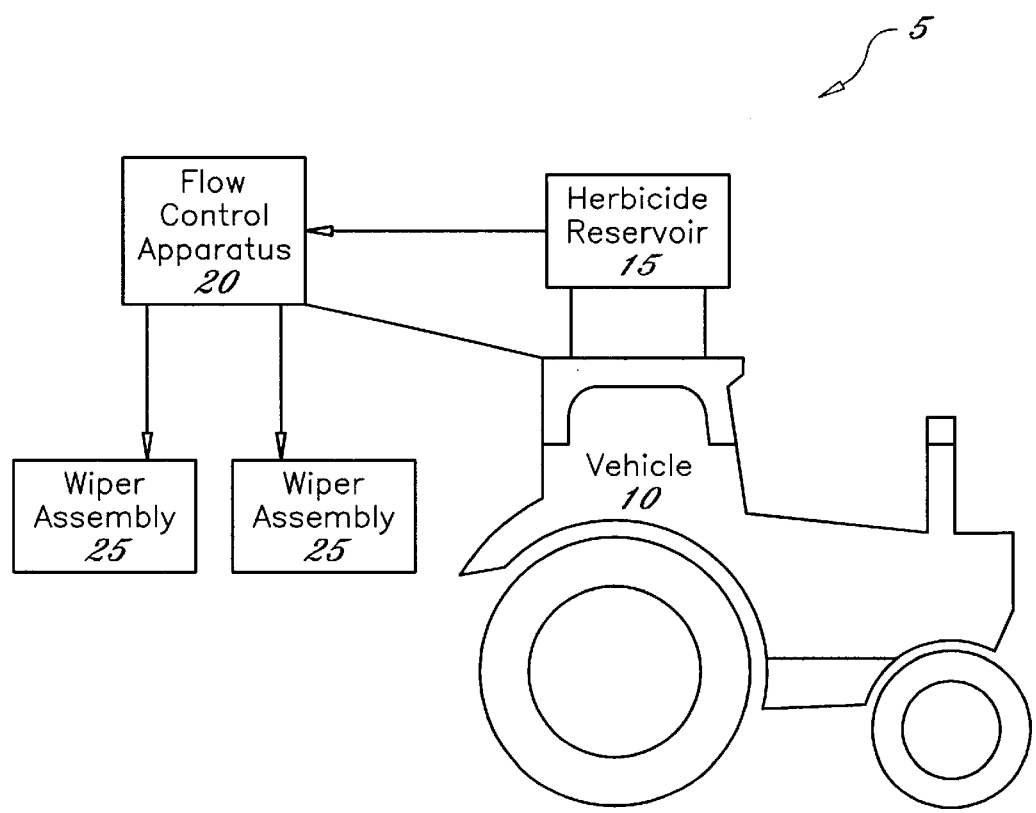
FIG. 1 is a schematic of the an herbicide applicator system.

Referring now to the drawings, in which like reference designators refer to like elements, there is shown in FIG. 1 a schematic diagram of an herbicide applicator system constructed in accordance with the principles of the present invention, and designated generally as 5. Herbicide applicator system 5 preferably includes: (i) a vehicle 10, (ii) an herbicide reservoir 15, (iii) a flow control apparatus 20, and (iv) one or more wiper assemblies 25. The herbicide reservoir 15 serves as the herbicide container. The flow control apparatus 20 meters and controls the flow of the herbicide from the herbicide reservoir 15 to the wiper assemblies 25. Wiper assemblies 25 apply the herbicide to the vegetation to be destroyed.

Figure 2:
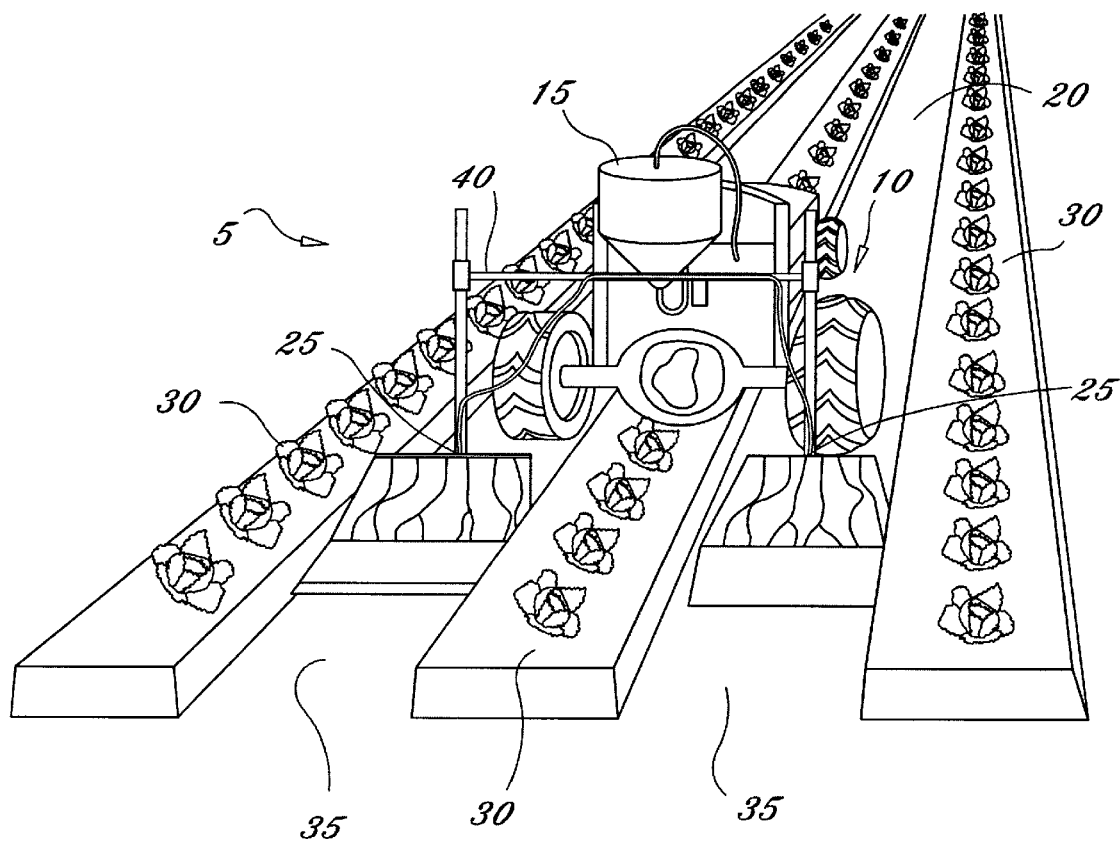
FIG. 2 is a perspective view of an herbicide applicator mechanism of the present invention mounted to a farming vehicle illustrating a manner in which the herbicide is applied to a field of furrowed crops.

As illustrated in FIG. 2, in a preferred embodiment, the wiper assembly 25 is mounted to the vehicle 10, along with a herbicide reservoir 15, and a flow control apparatus 20, and moved across a field of crops laid out in a commonly used configuration of crop rows 30 with furrows 35, or spaces, between the crop rows 30. One or more wiper assemblies 25 are preferably fixed to the vehicle 10 by an elongated member, referred to more generally as a tool bar 40.

Although any number of wiper assemblies 25 may be mounted to the tool bar 40, the preferred embodiment shows a pair of wiper assemblies 25 fixed to the opposite ends of the tool bar 40 at a width such that the bottom portions of the wiper assemblies 25 fit into, travel within, and adapt to the contours of the furrows 35.

Figure 3:
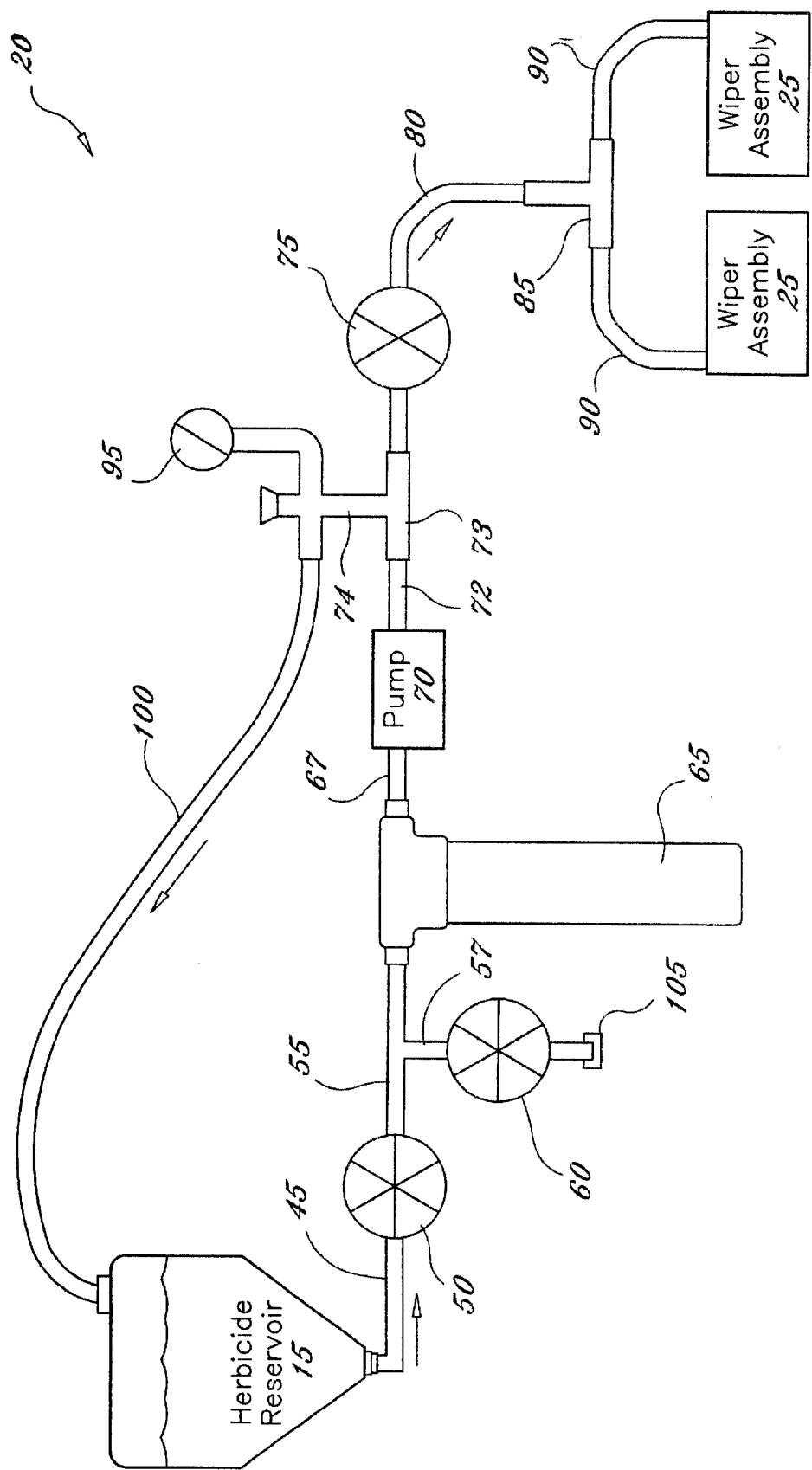
FIG. 3 is a diagram of an herbicide source and flow control system for use with the applicator device of the present invention.

A schematic diagram of the flow control apparatus 20 is shown in FIG. 3, illustrating the manner in which herbicide is supplied to each of the wiper assemblies 25. The herbicide flows from the reservoir 15 through conduits 45, thereafter through a cut-off valve 50, and thereafter into piping 55. The piping 55 includes a tee 57 coupled to a discharge valve 60. The herbicide exits the piping 55 and flows through a filter 65. The filter 65 is adapted to remove undesired impurities and particulate matter from the herbicide. After filtration, the herbicide flows through a conduit 67 into a pump 70, thereafter through conduit 72 and into piping 73. The piping 73 includes a tee 74. Upon exiting the piping 73, the herbicide flows through another cut-off valve 75 and continues flowing through one or more conduits 80 and tees 85 such that a single source conduit 90 is in fluid communication with each of the wiper assemblies 25 attached to the tool bar 40.

A pressure gauge 95 is preferably coupled to piping 73, and is employed to monitor the positive gauge pressure of the herbicide flowing downstream of the pump 70. A return conduit 100 can also be connected to the tee 74, thereby providing an operator with a way to re-fill the reservoir 15 when emptied.

The above-described conduits and pipes can be manufactured from any material suitable for transporting liquid chemicals such as herbicides, including but not limited to: flexible polymer or rubber tubing, rigid or semi-rigid pipes made of metals, polyvinylchloride and the like.

The pump 70 may be used to either draw herbicide from the reservoir and thereby pump it at positive gauge pressure into the wiper assemblies 25, or may be used to fill the reservoir, when cut-off valves 50 and 75 are closed and discharge valve 60 is open, with a supply of liquid herbicide connected to the discharge fitting 105.

Although the preferred embodiment of the flow control apparatus 20 includes a pump 70 to move the herbicide from the source reservoir 15 to the wiper assemblies 25, an alternative arrangement for moving the herbicide, such as a gravity feed, may be used.

Figures 4, 5:
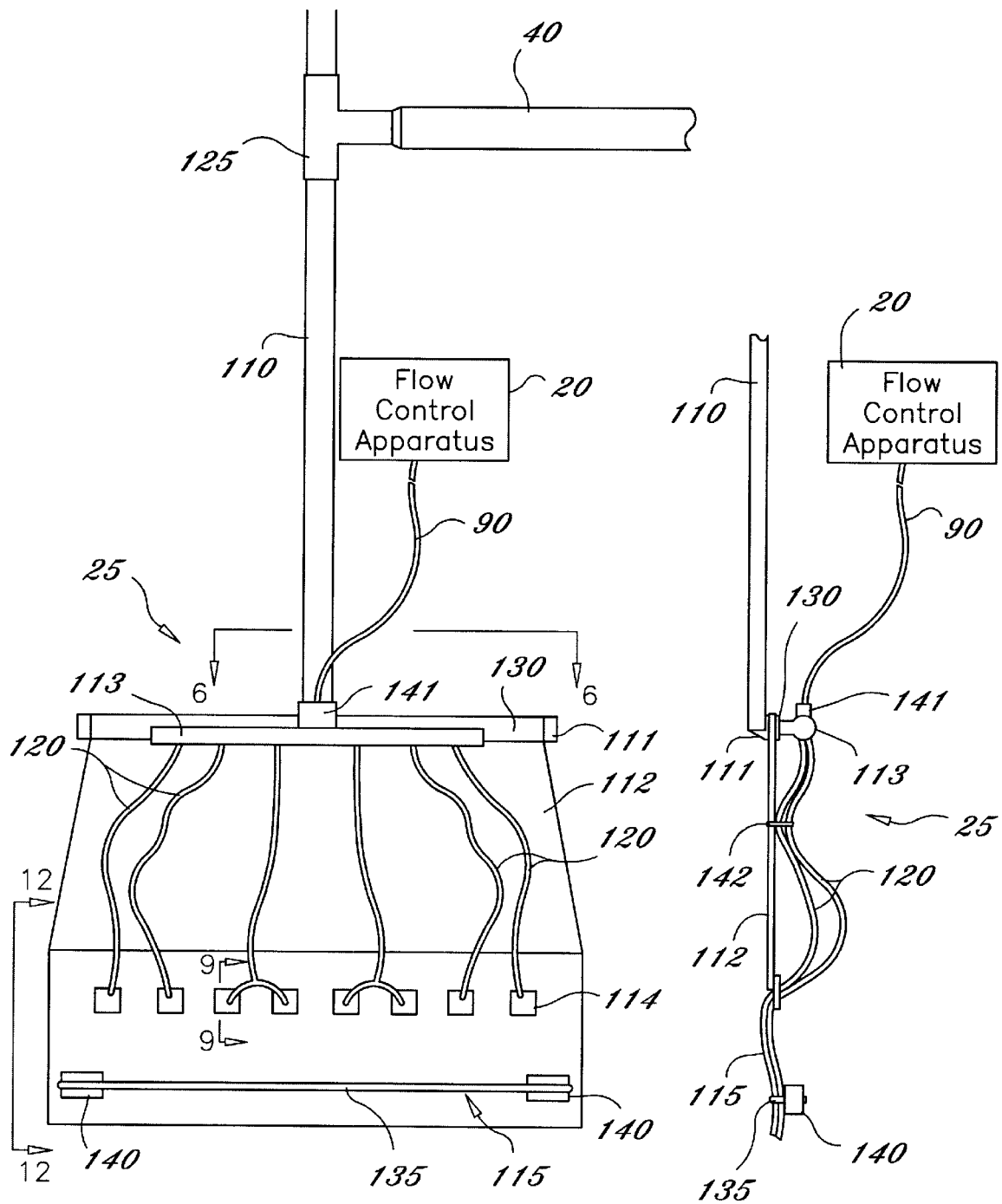
FIG. 4 is a rear view of the wiper assembly illustrating the herbicide intake manifold attached thereto with dispensing tubes distributing herbicide to the wiper assembly.
FIG. 5 is a side view of the wiper assembly of FIG. 3.

FIG. 4 shows a rear view of a wiper assembly 25 constructed in accordance with the principles of the present invention. The wiper assembly 25 preferably includes a mounting bar 110, a mounting L-beam 111, a wick coupling member 112, an intake manifold 113, one or more herbicide injection interface elements 114, one or more wick-sheets 115, one or more conduits 120, a tee linkage 125, a flat mounting beam 130, a stabilizing rod 135, one or more block weights 140, and an intake fitting 141.

Referring to FIG. 4, herbicide is preferably pumped at positive gauge pressure through a conduit 90 connected to a wiper assembly 25. The wiper assembly 25 is mounted to the tool bar 40 preferably by the mounting bar 110. The mounting bar 110 can be manufactured from a variety of materials, either being somewhat flexible, such as graphite or carbon composite, or substantially rigid, such as metal or polyvinylchloride. The mounting bar 110 is fixed at its upper end to the tool bar 40 by a rotatable tee linkage 125, such that the mounting bar 110 rests at a vertical position, substantially perpendicular to the ground. As herbicide is applied to the ground through a wiping action, the wiper assemblies 25 are free to rotate about the tee linkage 125 axis of rotation and thus deflect with respect to the vertical rest position of the mounting bar 110.

The herbicide enters the wiper assembly 25 through an intake manifold 113 incorporated therein. The intake manifold 113 includes an intake fitting 141 coupled to the conduit 90, which supplies liquid herbicide to the intake manifold 113 from the flow control apparatus 20. Herbicide then flows from the intake manifold 113 through one or more conduits 120. The end of each conduit 120 is coupled to an herbicide injection interface element 114. Each injection interface element 114 is disposed adjacent to the surface of a wick-sheet 115, whereby herbicide flows therethrough to saturate and occupy the liquid-absorbing wick-sheet 115. The herbicide injection interface element 114 acts as a distributor member for the dispersal and application of herbicide into the wick-sheet 115.

The wick sheets 1 15 are mounted to the lower edge of wick coupling member 112. Wick coupling member 112 is clamped in place between a first mounting L-beam 111, and a second flat beam 130. Wick coupling member 112 serves as an intermediate, stabilizing base element to keep the wick sheets 115 disposed in substantially one plane. The wick sheets 115 are further preferably arranged in a planar array of one or more layers, as more fully described herein below. The stabilizing rod 135 is mounted to one or more of the wick sheets with block weights 140 fixably attached to the ends of the wick sheets 115, preferably at substantially the lower end of the wick sheets 115. By mounting the stablizing rod 135 across the array of wick-sheets 115 as shown in FIG. 4, the orientation of the stablizing rod 135 being transverse to the direction of travel of the wiper assembly 25 as herbicide is applied, the wick sheets 115 may be kept substantially in one planar space, without deforming or curling, so as to allow for efficient application of herbicide.

FIG. 5 shows a side view of the wiper assembly 25 displayed in FIG. 4. Referring now to FIG. 5, the mounting bar 110 is fixed at its lower end to a rigid L-beam 111 perpendicular thereto. The mounting bar 110 and the rigid L-beam 111 form a frame which provides support for many other elements of the wiper assembly 25. The mounting bar 110 is in a horizontal position parallel to the ground and transverse to the direction of motion of the vehicle 10. As illustrated in FIG. 5, the entire wiper assembly 25 is substantially arranged within the plane subtended in space by the mounting bar 110 and rigid L-beam 111. One or more fastener rings 142 may be used, surrounding the conduits 120 and fixed to the wick coupling member 112, to prevent the potential entanglement of conduits 120 with outside objects.

Figure 6:
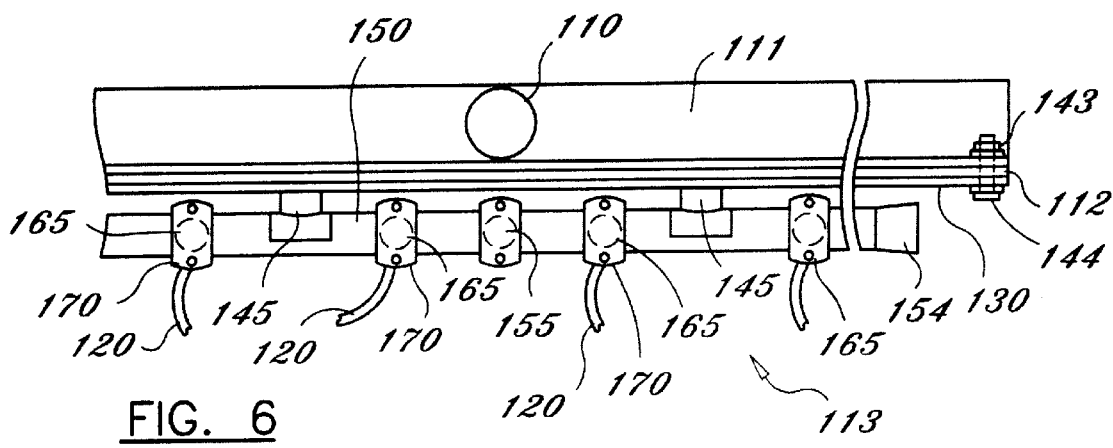
FIG. 6 is a plan view of an herbicide intake manifold on the wiper assembly.

FIG. 6 is a diagram showing a plan view of an intake manifold 113 mounted to the rigid L-beam 111. Referring now to FIGS. 5 and 6, a wick coupling member 112 of flexible yet substantially rigid material, such as heavy-gauge rubber or fiber-mesh, is placed at its upper end between the rigid L-beam 111 and a second flat rigid beam 130 parallel thereto. Wick coupling member 112 is preferably trapezoidal in shape, wherein the lower edge is wider than the upper edge coupled between the rigid L-beam 111 and the flat rigid beam 130. The rigid L-beam 111 and flat rigid beam 130 are clamped at their respective distal ends by fasteners, such as a nut 143 and bolt 144, so that the wick coupling member 112 is tightly sandwiched therebetween. One or more clamps 145 are fixed to one face of the flat rigid beam 130 to couple an herbicide intake manifold 113 to rigid beam 130.

The intake manifold 113 is preferably comprised of a hollow element 150 fitted with caps 154 at each end. The hollow element 150 is preferably tubular in shape and is fixed in place by clamps 145, and oriented in a substantially horizontal position parallel to the flat rigid beam 130. The intake manifold 113 is further comprised of at least one inlet opening 155 in the tubular element 150, allowing for the flow of herbicide into the intake manifold 113. As shown in FIG. 5, the intake manifold 113 is coupled to an inlet fitting 141, which is thereby coupled to the downstream end of the conduit 90 supplying herbicide from the flow control apparatus 20.

Referring to the intake manifold 113 shown in FIG. 6, herbicide at positive gauge pressure flows into the intake manifold 113 whereby the herbicide is distributed and exits through one or more exit openings 165 provided at the lower surface of intake manifold 113. The exit openings 165 are preferably provided such that the opening diameter in combination with the positive gauge pressure of herbicide flowing therethrough substantially evenly distributes the herbicide among exit openings 165. Each of the exit openings 165 is fitted with a corresponding coupling 170, which is thereby coupled to a conduit 120. The lower end of each of the flexible conduits 120 is coupled to an herbicide injection interface element 114 and affixed thereto preferably using tensile traction between the interface element 114 and flexible conduit 120.

Figure 7:
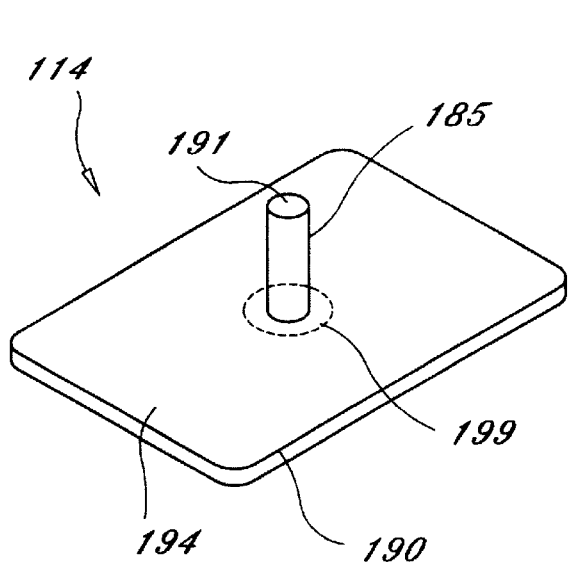
FIG. 7 is a perspective view of the top of an herbicide injection interface.
Figure 8:
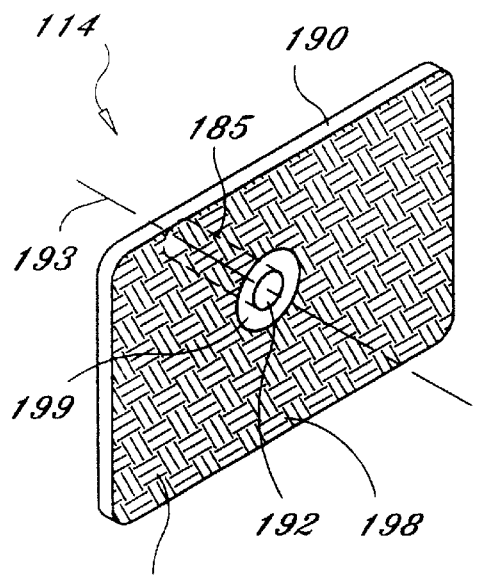
FIG. 8 is a perspective view of the bottom of the herbicide injection interface.

FIGS. 7 and 8 illustrate a top perspective and bottom perspective, respectively, of the herbicide injection interface element 114. The herbicide injection interface element 114 includes a conduit member 185, and a planar member 190. The conduit member 185 includes an inlet opening 191 to allow for the inflow of herbicide. The planar member 190 has an opening 192 therein, the opening 192 having a central axis 193, and an inlet side surface 194 and an exit side surface 198. The planar member 190 is preferably made of a substantially rigid material, such as plastic, and preferably has a circular or polygonal shape and a large surface area to volume ratio, like that of a credit card. The opening 192 is preferably placed approximately at the center of the planar member 190. The substantially rigid conduit member 185 passes through the opening 192. One end of the conduit member 185 is positioned through the interior of the opening 192. The exterior surface of the conduit member 185 is secured to the contact surface of the opening 192 using a suitable adhesive, or by means of compressive traction at the contact surfaces of the conduit member 185 and planar member 190. In the alternative, conduit member 185 can be molded as an integral part with planar member 190.

The conduit member 185 is preferably oriented substantially perpendicular to the planar member 190, or in such an orientation that allows for the conduit member 185 to be fixed to the planar member 190 whereby there preferably exists a distance between the inlet end 191 of the conduit member 185 and the inlet side surface 194 of the planar member 190 sufficient to allow for the herbicide injection interface element 114 to be arranged in the wiper assembly 25 as described below. Alternatively, it is understood that the injection interface element 114 may be designed in numerous ways, with or without an element such as conduit member 185, such that herbicide is supplied from a source conduit to the planar member 190, and that the embodiment disclosed herein is but only one preferred arrangement of the device.

Figure 9:
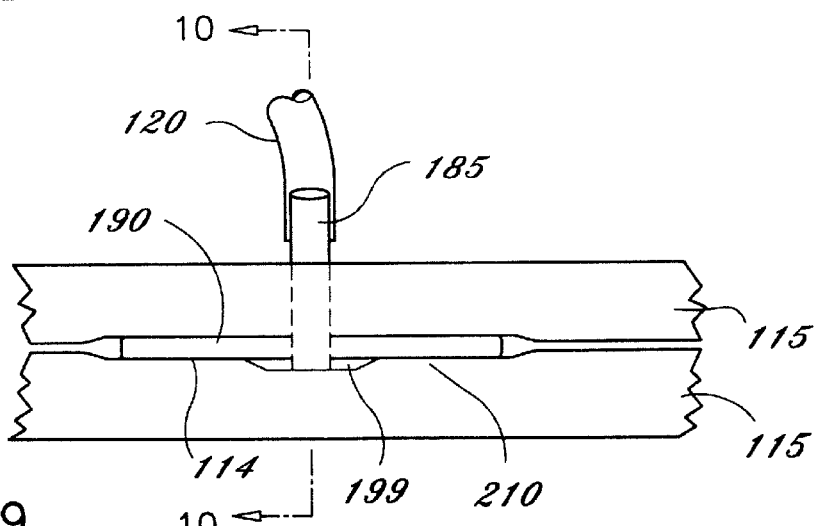
FIG. 9 is a cross-sectional view of the wiper assembly taken from section 9—9 in FIG. 4.
Figure 10:
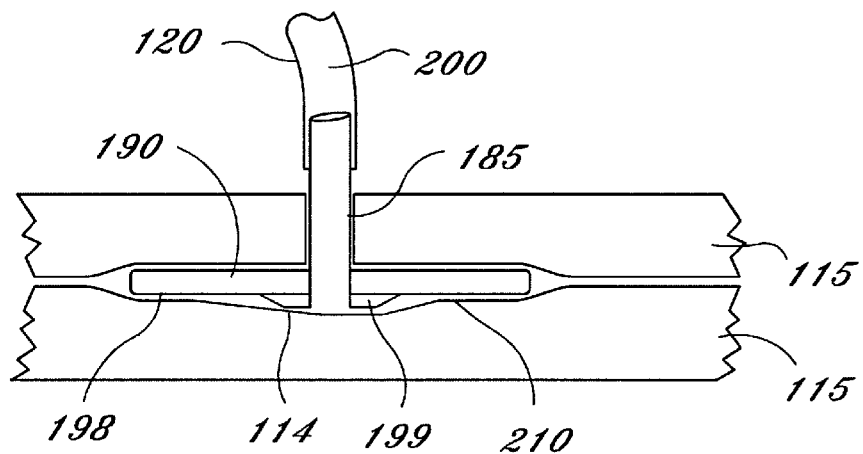
FIG. 10 is a cross-sectional view of the wiper assembly taken from section 10—10 in FIG. 9.

As shown on FIG. 8, the exit side surface of the flat planar member 190 is preferably covered with a matrix of fluid-permeable hook and fastener material 210, such as Velcro, placed thereupon so as to enable the herbicide injection interface element 114 to be securely affixed to the planar array of overlapping wick sheets 115, as more specifically illustrated in FIGS. 9 and 10. Alternatively, planar member 190 may be manufactured to integrally include the matrix of fluid-permeable hooks and ridges by molding the exit side surface 198 of planar member 190 to comprise a layer of such fluid-permeable hooks and ridges, such that the features of planar member 190 and the matrix of fluid-permeable hook and fastener material 210 are combined into a single unitary element. The exterior surface of the distal edge portion of conduit member 185 protruding through opening 192 is circumscribed by a planar lip element 199 attached to the conduit member 185. Planar lip element 199 has a flattened toroidal washer-like shape. Planar lip element 199 is positioned to spatially affix the orientation of conduit member 185 to planar member 190 such that the end of conduit member 185 (excluding the portion circumscribed by planar lip element 199) is substantially flush with exit side surface 198.

FIGS. 9 and 10 show a herbicide injection interface element 114 positioned within wick sheets 115. The conduit member 185 of the herbicide injection interface element 114 is coupled to a flexible conduit 120 to facilitate the flow of herbicide into the wick sheets 115. FIG. 10 illustrates the herbicide 200 flowing into the conduit member 185. As shown in FIG. 10, the liquid herbicide 200 flows out from the rigid tubular conduit member 185 and is distributed at the exit side surface 198 of the planar member 190 through the contact plane formed between the hook and fastener material 210 and the wick sheet 115. Though the combined forces of gravity, hydraulic pressure, and capillary action, the liquid herbicide 200 flows throughout the planar array of wick sheets 115 such that the wick sheets 115 are substantially saturated. The wick sheets 115 are sufficiently saturated when herbicide permeates the wick sheet 115 and is exposed on the exterior surfaces of the wick sheet 115. At this sufficient saturation level, herbicide may be applied using a wiping action to any surface with which the wick sheet 115 comes into contact. Of course any other arrangement for affixing the injection interface element 114 to wick sheets 115 can be used as long as a fluid path for the herbicide is provided as described below.

Figure 11:
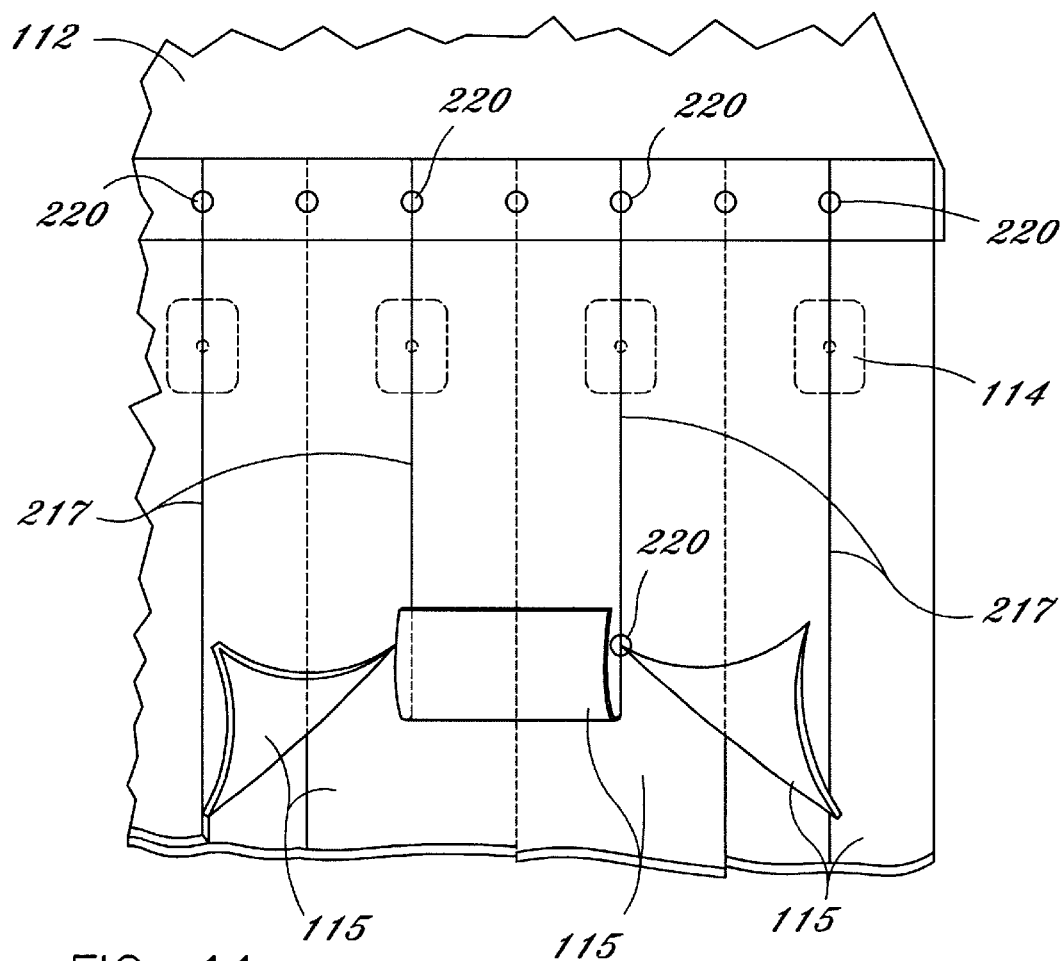
FIG. 11 is a rear view of the wiper assembly showing the planar arrangement of the array of wick sheets.

FIG. 11 shows a preferred arrangement of wick sheets 115 attached to the wick coupling member 112 so as to allow for the application of herbicide to the desired surface. Referring now to FIG. 11, an array of planar overlapping wick sheets 115 are attached at their upper end by fasteners 220 to the lower end of the wick coupling member 112. The wick sheets 115 are overlaid to form parallel planar layers placed adjacent to one another. Two parallel planar layers are shown in FIG. 11. Each of the individual strips of wick sheets 115 are positioned side by side, such that the boundary 217 between one pair of wick sheets 115 oriented on a first layer is overlaid at approximately the midpoint of another wick sheet 115 in a second adjacent layer.

The wick sheets 115 are preferably made of a suitable substantially flexible, liquid-absorbing material, such as a dense woven fabric or synthetic polymer mesh, so as to absorb a substantial amount of herbicide flowing from the plurality of injection interface elements 114 embedded between the parallel planar array of wick sheets 115.

It is emphasized that the foregoing spatial arrangement of the wick sheets 115 is only one example of a preferred embodiment of the present invention. Any number of alternative arrangements may be used so as to provide for the application of herbicide using herbicide-saturated wicks applied to a desired contact surface using a wiping action. For example, although FIG. 11 shows an array of parallel planar wick sheets 115 of substantially equal length, the arrangement of wick sheets 115 can also incorporate individual wick sheets 115 of varying length.

Figure 12:
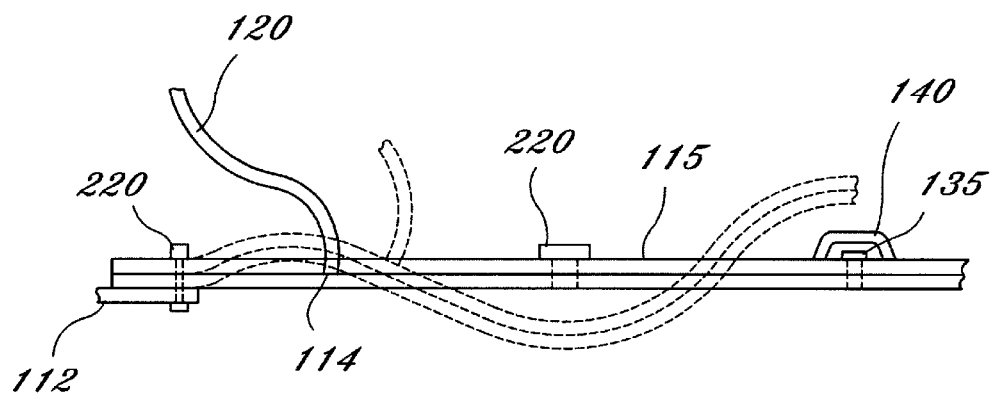
FIG. 12 is a cross-sectional view of the wiper assembly taken from section 12—12 in FIG. 4.

FIG. 12 is cross-sectional view of the wick sheets 115, illustrating the capability of the wick sheets 115 to deform and thereby conform to the desired application surface. Due to the flexibility of the parallel planar array of wick sheets 115, as illustrated by the hash-lines in FIG. 12, the liquid herbicide is applied in such a manner as to allow the wiper assembly 25 to substantially deform and conform to the contours of the ground in the furrows 35. This enables the herbicide to efficiently cover the targeted surfaces and be applied with a minimum of waste, because the wick sheets 115 are saturated only to the point of allowing the herbicide to adhere to an exterior surface through contact and not through excess dripping. Of course, this result is contingent on the user effectively metering the overall flow of herbicide through the apparatus so that the wick sheets 115 are not excessively saturated. It is understood that the particular level of wick sheet 115 saturation required for the efficient operation of the device can be ascertained by the user through (i) repeated iterative operation of the device, or (ii) by observing the flow of herbicide as it is applied, and accordingly making subsequent adjustments to the flow control apparatus 20 and subsequent corresponding herbicide flow rate through the apparatus.

As shown in FIGS. 4 and 12, a rigid stabilizing rod 135 is optionally placed horizontally at the lower end of the planar array of wick sheets, being parallel thereto and secured at either end thereof by a solid block weight 140. The rigid stabilizing rod 135 serves to prevent the highly flexible array of wick sheets 115 from becoming entangled. This allows the array of wick sheets 115 to substantially remain in a single plane so as to enable uniform application of herbicide onto the ground.

In operation, as illustrated in FIGS. 2 and 4, the parallel planar array of wick sheets 115 of the wiper assembly 25 is dragged behind the vehicle 10 through a furrow 35 in a field so as to apply liquid herbicide onto any vegetation growing therein. The weeds and other undesired vegetation in the furrows 35 come into contact with the herbicide, and the desired response, such as killing the weeds, is facilitated.

Figure 13:
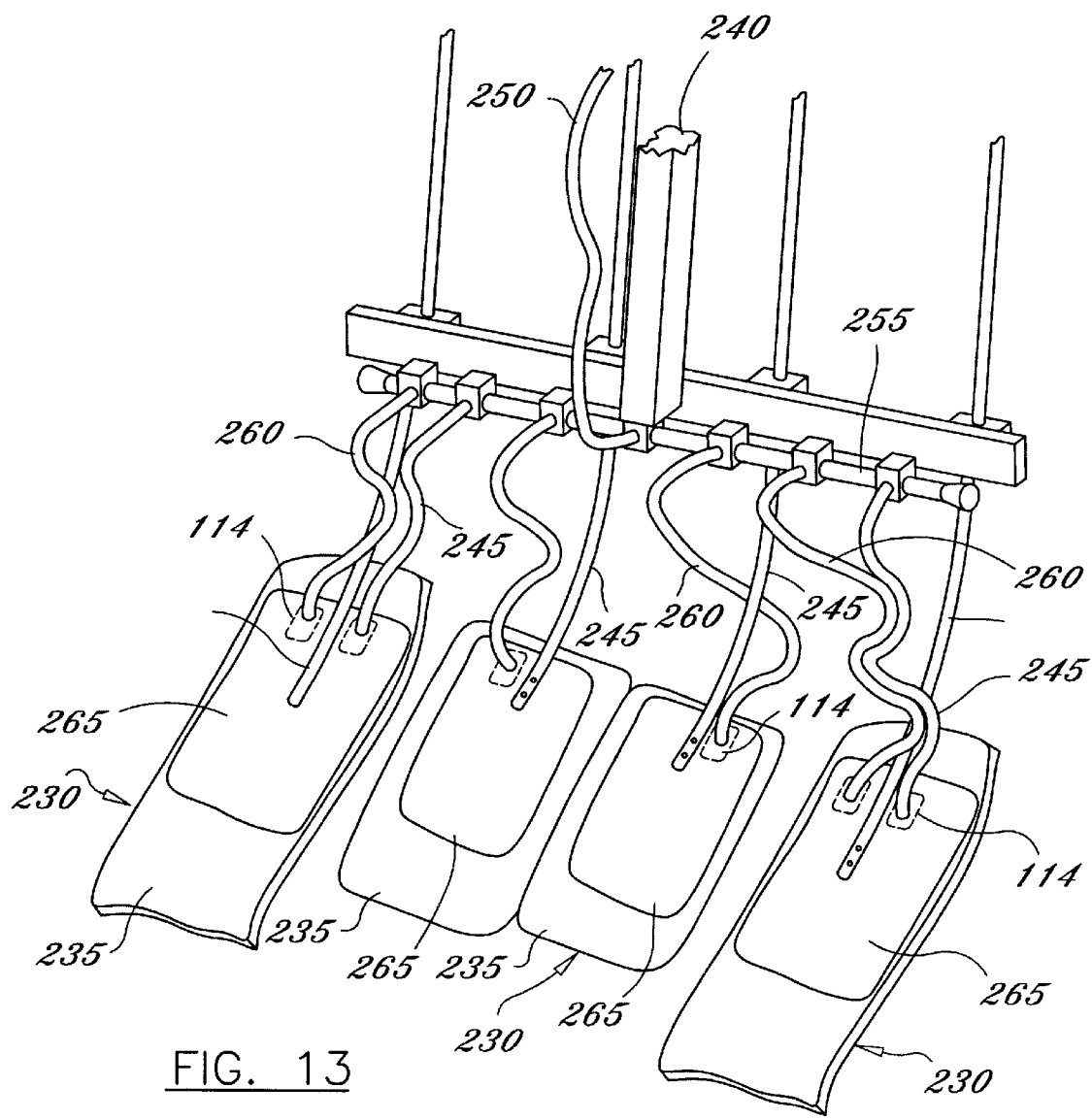
FIG. 13 is a perspective view of an alternate arrangement of the wiper assembly.

FIG. 13 shows another aspect of the invention, in which the parallel planar array of wick sheets has preferably been replaced by a plurality of individual co-planar wick assemblies 230. The wick assemblies 230 include a planar wick sheet 235 coupled to at least one injection interface element 114, and are fixably attached to a tool bar 240, by one or more elongated members 245, preferably made of an elastically deformable solid material, such as a graphite, fiberglass, or polymer rod. The herbicide is again supplied via an inlet tube 250 to a manifold 255, and thereby distributed to the individual co-planar wick sheets 235 by flexible conduits 260. At the end of each flexible conduit, an injection interface element 114 is provided and used in a manner similar to that of the previously discussed embodiment. Each individual planar wick sheet 235 is further spread out to retain a substantially planar shape by a reinforcement sheet 265. Reinforcement sheet 265 is preferably made of a substantially rigid material, such as plastic or wire-mesh.

The present invention therefore advantageously provides a system which allows a chemical such as a non-selective herbicide to be safely applied to undesired vegetation, such as weeds growing in a furrow, in a manner which does not waste chemical product, and applies the chemical to the undesired vegetation without disturbing the desired vegetation. By applying the chemical to the surface via a wiping action, the present invention is useful for direct surface contact with undesired vegetation growth as well as contact with a surface which may have undesired seedlings or ungerminated undesired seeds.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A chemical applicator apparatus for applying a chemical from a chemical supply source to a surface, comprising:

an interface element in fluid communication with a respective fluid distribution opening, the interface element receiving the chemical flow from the fluid distribution opening;

a wick sheet in fluid communication with the interface element, the wick sheet absorbing the chemical flow from the interface element;

an intake manifold having a fluid receiving opening, the fluid receiving opening receiving a chemical flow from the chemical supply source, and a fluid distribution opening, the fluid distribution opening distributing the received chemical flow;

a frame, the intake manifold being coupled to the frame; and a wick coupler having a first end coupled to the frame, and a second end opposite the first end, the second end being coupled to the wick sheet;

wherein the interface element is comprised of a chemical dispersal member having a first surface, a second surface opposite the first surface, and an opening having a central axis, the opening forming a passage connecting the first surface and second surface, and a conduit member, the conduit member being centered about the central axis of the corresponding opening, the conduit member having a receiving opening, the receiving opening being in fluid communication with the intake manifold, a distribution opening opposite the receiving opening, the distribution opening being coupled to the first surface of the chemical dispersal member; and a material permeable to fluid, the material being adherable to at least a portion of the second surface and the wick sheet, the material dispersing the chemical about the second surface and into the wick sheet.

2. The chemical applicator apparatus according to claim 1, wherein a plurality of wick sheets are arranged in a plurality of parallel planar arrays, and a plurality of interface elements are disposed substantially between the parallel planar arrays.

3. The chemical applicator apparatus according to claim 2, wherein at least one wick sheet has a first length and at least one other wick sheet has a second length different from the first length.

4. The chemical applicator apparatus according to claim 1, wherein a stabilizing block member is coupled to the wick sheet.

5. The chemical applicator apparatus according to claim 4, wherein a stabilizing rod is coupled to a plurality of stabilizing block members.

6. The chemical applicator apparatus according to claim 1, wherein the wick sheet is comprised of one of a dense woven fabric and a synthetic polymer mesh.

7. The chemical applicator apparatus according to claim 1, wherein each of a plurality of wick couplers are arranged to couple a corresponding wick sheet to the frame.

8. The chemical applicator apparatus according to claim 1, wherein the chemical is an herbicide.

9. A chemical applicator apparatus for applying a chemical from a chemical supply source to a surface, comprising:

a frame; and a wick assembly coupling member having a first end portion being adjustably coupled to the frame, a second end portion opposite the first end, and a plurality of wick assemblies, each of the plurality of wick assemblies being coupled to the second end portion of a corresponding wick assembly coupling member, the plurality of wick assemblies being in fluid communication with the chemical supply source, each wick assembly wipingly applying the chemical to the surface;

wherein the wick assembly comprises a wick sheet, a reinforcement sheet having an end portion, the reinforcement sheet being fixedly coupled the wick sheet at least at the end portion, and an interface element disposed between the wick sheet and the reinforcement sheet, the interface element being in fluid communication with the chemical supply source; and wherein the interface element is comprised of a chemical dispersal member having a first surface; a second surface opposite the first surface; and an opening having a central axis, the opening forming a passage connecting the first surface and second surface; and a conduit member, the conduit member being centered about the central axis of a corresponding opening, the conduit member having a receiving opening, the receiving opening being in fluid communication with the chemical supply source; and a distribution opening opposite the receiving opening, the distribution opening being coupled to the first surface of the chemical dispersal member.

10. The chemical applicator apparatus according to claim 9, wherein at least one wick sheet has a first length and at least one other wick sheet has a second length different from the first length.

11. The chemical applicator apparatus according to claim 9, wherein the chemical is an herbicide.

12. The chemical applicator apparatus according to claim 9, wherein the plurality of wick assembly coupling members are elastically deformable.

* * * * *